Feb. 1, 1966  C. W. KULIG  3,232,411
CONTAINER ENLINING MACHINE
Filed Sept. 17, 1963  3 Sheets-Sheet 1

INVENTOR.
CONSTANTINE W. KULIG
BY
McCormick, Paulding & Huber
ATTORNEYS

Feb. 1, 1966 C. W. KULIG 3,232,411
CONTAINER ENLINING MACHINE
Filed Sept. 17, 1963 3 Sheets-Sheet 2

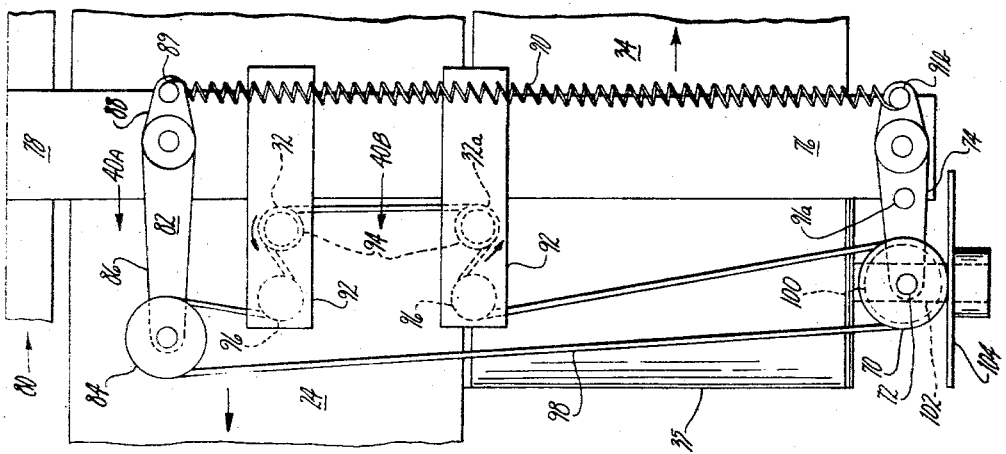
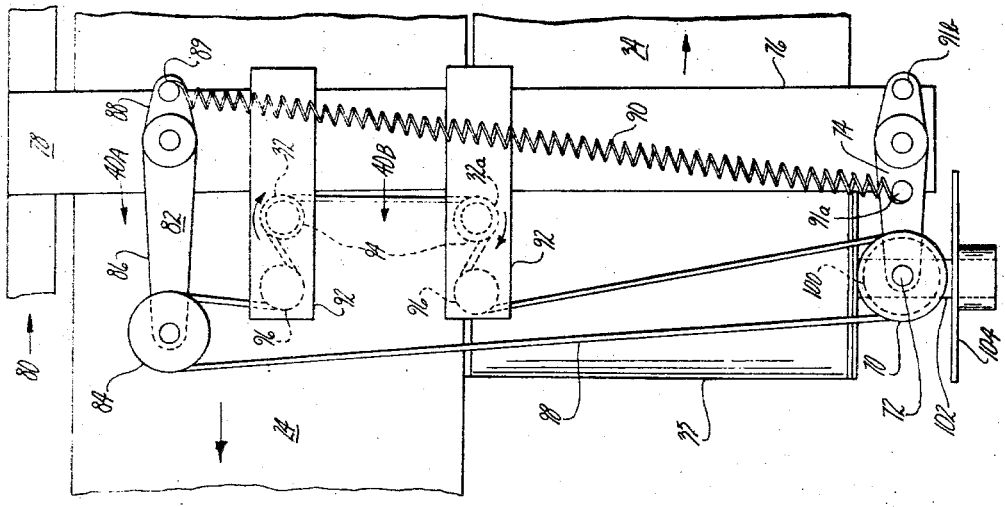

United States Patent Office 3,232,411
Patented Feb. 1, 1966

3,232,411
CONTAINER ENLINING MACHINE
Constantine W. Kulig, Windsor, Conn., assignor to Emhart Corporation, a corporation of Connecticut
Filed Sept. 17, 1963, Ser. No. 309,427
15 Claims. (Cl. 198—30)

The present invention relates to container handling devices, and more particularly to a machine for accepting a plurality of containers and depositing the same in single or multiple lines on a conveyor.

A general object of the present invention is to provide a container handling machine capable of depositing a series of containers on a moving conveyor in spaced, aligned relationship.

Another general object of the present invention is to provide a container enlining machine capable of depositing a series of containers in a plurality of lines on a primary conveyor so that these containers can be more readily accommodated by other container handling machines in a container production plant.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 5 is a plan view of a second alternative configuration for the roller supporting and rotating structure; and FIG. 6 is a plan view of a third alternative configuration for the roller supporting and rotating structure.

Figure 1:
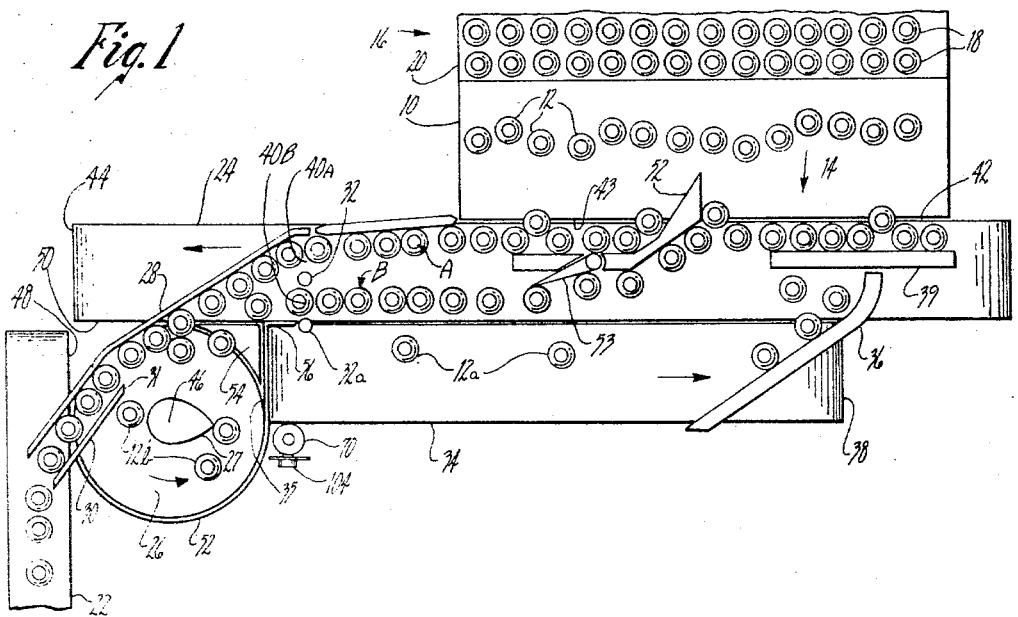
FIG. 1 is a plan view of one embodiment of the present invention.

Referring now to the drawings in greater detail, FIG. 1 shows a vibrating transfer plate 10 across which a plurality of containers 12, 12 are fed in the direction of the arrow 14. This plate 10 is of well-known construction and therefore need not be described in detail here. In the present invention said plate comprises a convenient means for loading containers into the machine of FIG. 1. Although other loading means could be employed, the vibrating transfer plate 10 is well suited to use in conjunction with an annealing lehr for glass containers such as is indicated generally at 16. Two rows of finished containers 18, 18 are shown being fed from the lehr by a wide conveyor 20. This slowly moving conveyor 20 when coupled with the somewhat faster operating vibrating transfer plate 10 provides a very efficient loading means for feeding a plurality of containers into a machine of the present invention.

With further reference to FIG. 1, the function of the machine there illustrated is to deposit the containers being fed across the plate 10 on a rapidly moving primary or take away conveyor belt 22. These containers are sequentially deposited single file on the belt 22 in accurately aligned relationship by the machine shown in FIG. 1. The primary elements of this machine comprise a transfer conveyor belt 24, a rotating transfer disc 26, suitable container guiding means 28 and 30 and at least one pair of rotatable guide rollers, 32 and 32a, for properly routing the containers through the machine onto the said primary conveyor 22. Also included in the subject machine is a return conveyor belt 34 which moves at a somewhat slower speed than that of the transfer belt 24, but in the opposite direction. This return belt 34 travels adjacent to said transfer belt 24 and provides a recirculating means for containers 12a, 12a which fail in the first attempt to enter into line. Suitable guide means 36 are provided at the downstream end 38 of said return conveyor belt 34 whereby said recirculated containers are ultimately re-fed onto said transfer belt for a second pass at the line onto the take away conveyor.

Still with reference to FIG. 1, the transfer conveyor 24 is seen to have an edge portion 42 which is located adjacent to the downstream edge 43 of the previously mentioned vibrating transfer plate 10. This transfer conveyor 24 is shown oriented at right angles to the primary conveyor 22 and the downstream end 44 thereof is located in closely spaced relationship to said primary conveyor. It will be apparent that said transfer conveyor could be positioned at other angles according to machine layout requirements.

The previously mentioned disc 26 is generally horizontal and coplanar with the horizontal plane defined by the abovementioned conveyor belts. The disc 26 rotates about a vertical axis 46 which is perpendicular to said horizontal plane, which axis is equally spaced from the adjacent edges 48 and 50, of the primary and transfer conveyors 22 and 24 respectively, so that the circumference of the disc remains tangent to these edges as it rotates about said axis 46.

While the disc 26 can only be tangent to these conveyors 22 and 24 at a single point on each, it will be apparent from FIG. 1 that a single line of containers of the size shown can be guided across the disc from the transfer conveyor to the take away conveyor, because the disc is of considerably greater diameter than the diameter of a single container. The abovementioned guide means or rails 28 and 30 define a track across the disc and onto the take away conveyor capable of accepting only a single line of containers.

As shown in FIG. 1, the containers loaded on the transfer conveyor 24 are divided into two lines A and B by a dividing means 52 which splits the containers into two groups as they are vibrated across the transfer plate 10. Looking in the direction of motion of the transfer belt 24, the first group is guided along the right side thereof by the right side of said dividing means to form line A while the second group is guided by the left side of said dividing means to form a second line B along the left side of said conveyor. A pivotal vane 53 permits very accurate lateral spacing of these lines A and B.

As so arranged, the transfer conveyor 24 can be operated at a speed slower than that of the take away conveyor 22 and thereby easily accommodate containers fed thereto by said transfer plate 10. On the other hand, were these containers to be fed directly onto the take away conveyor 22 from said transfer plate 10, many of them would be toppled as a result of the abrupt change in speed. The function of the dividing means 52 is to permit these containers to be accepted by the transfer conveyor at a rate which is unaffected by its relatively slow speed. For example, without this dividing of the flanked containers 18, 18 into at least the two columns or lines A and B, that container at the upstream end of the transfer conveyor 24 would have to be conveyed at least to the left-hand end of the transfer plate 10 before another group of flanked containers could be accepted by the transfer conveyor 24. On the other hand, the dividing means 52 permits another group of flanked containers to be so accepted as soon as the said container occupying said furthest upstream position has been conveyed downstream to the left side of the dividing means 52. Thus the dividing means 52 plays an important role in a machine of the present invention, especially when said machine is operated in conjunction with a relatively fast moving primary or take away conveyor.

In view of the reasons for resorting to two lines of containers on the transfer conveyor, it will be apparent that these lines or columns A and B must be merged into a single line in the single enliner machine of FIG. 1. This merging is accomplished by the cooperative action of the transfer conveyor 24, the guide rails 28 and 30, and a pair of rollers 32 and 32a. A gate 40A, defined by the upstream end of guide rail 28 and the center roller 32, receives the right-hand line or column A, and a second gate 40B, defined by said roller 32 and the side roller 32a, receives the left-hand line or column B. These rollers can be rotated in any suitable direction by one or more mechanisms provided for that purpose and to be described in greater detail hereinbelow.

After passing one or the other of these gates, the containers are carried along by the transfer conveyor 24 towards the guide rail 28. The latter is so located with respect to the point of tangency between said conveyor and the disc 26 that the containers are fed onto the disc and between said guide rails 28 and 30 as shown in FIG. 1. The double line of containers being delivered by the transfer conveyor 24 is thus merged into a single line for passage between these guide rails 28 and 30. Those containers 12b, 12b which cannot be accommodated therebetween will be circulated on the disc 26 as indicated in FIG. 1. The leading edge 31 of the guide rail 30 causes the superfluous containers 12b, 12b to be deflected radially inwardly on the rotating disc 26. As these containers are carried counterclockwise by the rotating disc 26, each is urged radially outwardly by the tear shaped stationary center post 27. This post is so shaped that each container 12b is once again placed in a position for possible entry into the single line of containers where it can pass between the guide rails 28 and 30. A fixed peripheral fence 52 extends part way around the outer circumference of the disc 26 from a point near the guide rail 30 at least as far as the upstream end 35 of the return conveyor 34. This fence assures that in the event of a pile up of containers on the disc 26, none of the deflected containers 12b, 12b are inadvertently pushed off the machine.

According to the construction shown in FIG. 1, a generally triangular slide plate 54 is provided between the rotating disc 26 and the transfer conveyor 24 so that the double line of containers on the latter can be gradually merged into the single line as required. Since the transfer conveyor 24 delivers containers to the disc 26 at a rate which may vary during operation of the machine the double line can momentarily extend as far downstream as the aforementioned leading edge 31 of the guide means 30 and therefore the said plate 54 is provided to accommodate such an accumulation of containers in the area between said transfer conveyor 24 and the disc 26. A continuation of the fixed fence 52 extends laterally across the upstream end 35 of the return conveyor 34 and turns 90° at the corner 56 to provide a guide for the containers from line B downstream of the roller 32a.

In operation, containers are loaded into the single enliner of FIG. 1 from an annealing lehr or other similar machine, indicated generally at 16, by the vibrating transfer plate 10. The latter is preferably operated at a somewhat higher speed than that at which the machine's conveyor 20 is turning out said containers so that no containers are allowed to accumulate on the transfer plate 10. As the containers move across the plate 10 they are separated into two groups by the dividing means 52. One group is carried in a line A down the right side of the transfer conveyor 24. The other group is displaced to the left by this divider and its associated vane 53 so as to be carried in a line B down the left side of the said conveyor. Any of the containers 12a, 12a which have failed to enter the gates 40A or 40B are re-routed into line B by the return conveyor 34 and its associated guide means 36. An auxiliary guide bar 39 is provided to assure that the re-routed containers 12a, 12a do not interfere with the formation of line B.

Both lines A and B are delivered to their respective gates 40A and 40B where they are alternately fed into a single line. In the event that too many containers are fed through these gates the excess containers 12b, 12b are circulated on the disc 26. The chief function of disc 26 is to carry the containers from the transfer conveyor 24 to the take away conveyor 22. Guide rails 28 and 30 assure that the containers 12, 12 being so carried do not tip sideways, and the downstream end of said latter guide rail assures that the containers are deposited on the take away conveyor in accurate lineal alignment. Thus, the single enliner of FIG. 1 not only deposits containers systematically on the take away conveyor 22, but also recirculates containers which cannot be so deposited until such time as said recirculated containers can be deposited on said primary or take away conveyor.

Figure 2:
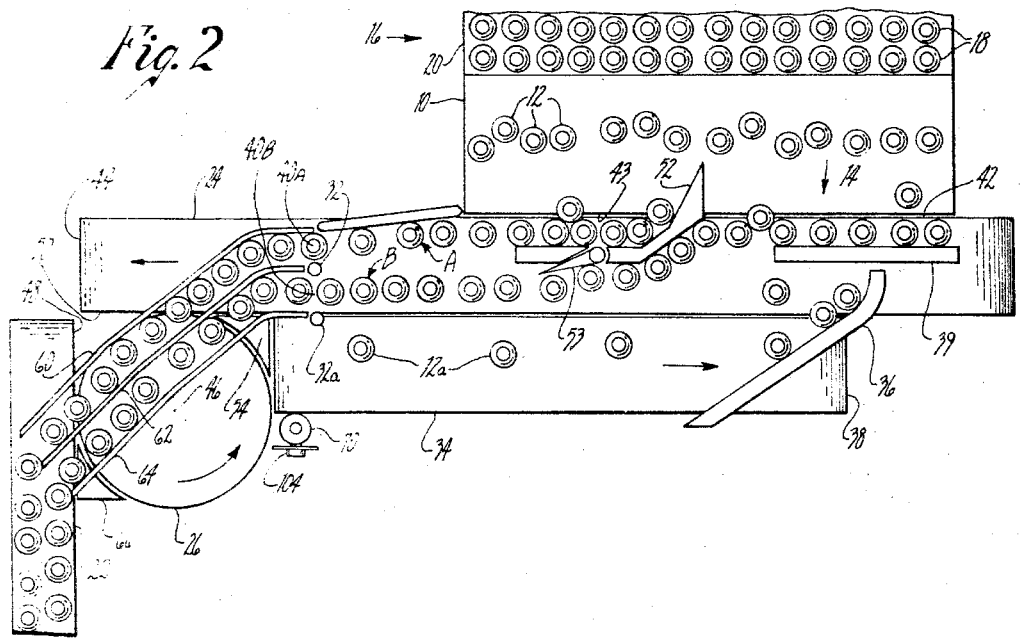
FIG. 2 is a plan view of an alternative embodiment of the present invention.

FIG. 2 illustrates an alternative embodiment of the present invention wherein the double line arrangement of containers on the transfer conveyor 24 of FIG. 1 is retained throughout a machine of the present invention, the containers being deposited on the take away conveyor in a double line as well as being accurately spaced and aligned as in the FIG. 1 machine.

Thus, the FIG. 2 machine is generally similar to that shown in FIG. 1 in that the containers being loaded into the machine by the vibrating transfer plate 10 are divided into two groups by the dividing means 52 which forms two parallel lines of containers, A and B, on the transfer conveyor 24. The return conveyor 34 relieves momentary congestion in the area upstream of the gates 40A and 40B by removing superfluous containers 12a, 12a from the vicinity of said gates and returning the same to the upstream end of said transfer conveyor 24 where they are reinserted in line B on said conveyor 24 with the aid of the guide bars 36 and 39.

The rotating disc 26 of the FIG. 1 machine is utilized in transferring containers from this transfer conveyor 24 to the take away conveyor 22, but instead of the two guide rails of the previous device a series of three container guide rails 60, 62 and 64 replace the guide rails 28 and 30 employed in the FIG. 1 machine. Since the double line of containers on the transfer conveyor 24 is to be deposited on the take away conveyor 22 in this double line configuration, there is no requirement for accommodating superfluous containers on the rotating disc 26 as in the FIG. 1 machine. Consequently, the guide rail 30 of the latter machine can be replaced by a longer second guide rail 62 which extends from the downstream location of the said FIG. 1 guide rail 30 upstream to the central roller 32, as shown. Also in the same vein a third guide rail 64 extends in a generally parallel relationship to said second guide rail so as to direct the containers in line B across the disc 26 and onto the take away conveyor 22. The containers in line A are routed across the disc 26 by a first guide rail 60 which corresponds to the guide rail 28 described heretofore with reference to the FIG. 1 construction.

As mentioned, the FIG. 2 machine does not involve the recirculation of superfluous containers on the rotating transfer disc 26 and therefore the stationary post 27 and peripheral fence 52 of the FIG. 1 machine are not required on this machine. The triangular slide plate 54 of the FIG. 1 machine, however, is required in the FIG. 2 machine and for the same reason, namely to accommodate a double line of containers adjacent the point of tangency between said disc 26 and the transfer conveyor 24. A second triangular slide plate 66 is also required in the FIG. 2 machine adjacent the point of tangency between said disc and the primary conveyor 22 for the same reason.

Figure 4:
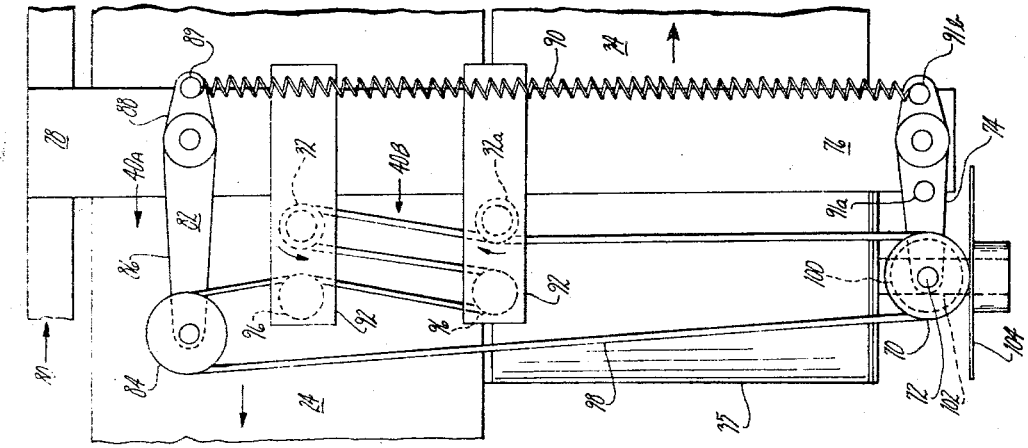
FIG. 4 is a plan view of an alternative configuration for the roller supporting and rotating structure.
Figure 3:
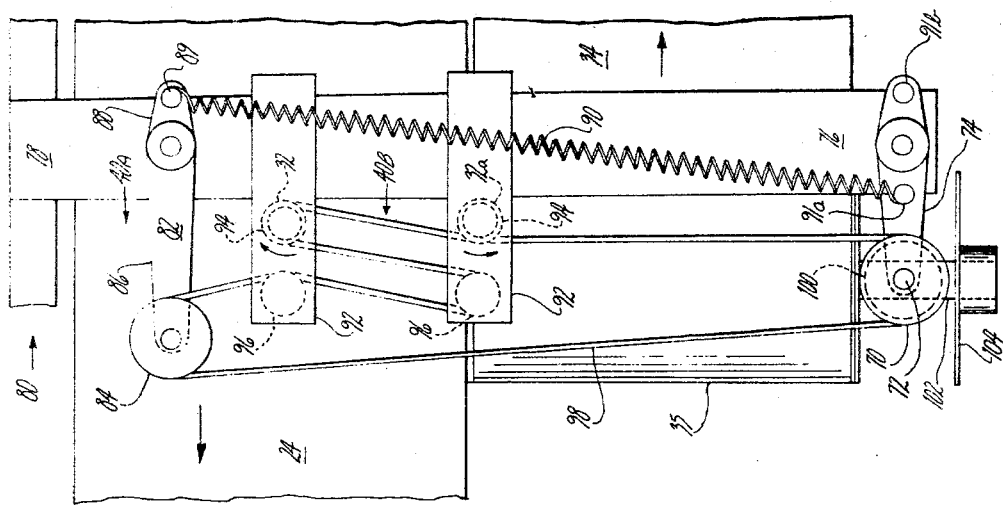
FIG. 3 is an enlarged plan view of one configuration for supporting and rotating guide rollers that are employed in the machine of FIGS. 1 and 2.

FIGS. 3–6 illustrate several configurations for supporting and rotating the rollers 32 and 32a. All of these permit lateral adjustment of these rollers both collectively and individually. Collectively altering the lateral position of these rollers with respect to the transfer conveyor 24 permits the accommodation of a single line of containers on said conveyor. In such a case the divider 52 would not be required and in its place a longer version of the guide 39 would suffice. The individual lateral adjustment of these rollers, 32 and 32a, permits the machines shown in FIGS. 1 and 2 to be set up for handling containers of a size and shape other than that shown in the drawings. The several roller configurations shown in FIGS. 3–6 differ only in the relative directions of rotation of the individual rollers. FIG. 3 shows a preferred arrangement for the rather simple container shape shown in FIGS. 1 and 2 wherein the majority of containers are urged into the gate 40B. FIG. 4 shows another possibility for containers of a more exotic shape wherein the containers would be urged away from said gate 40B. FIG. 5 shows yet another roller rotational arrangement wherein both rollers turn in the same clockwise direction so that containers approaching the center roller 32 are urged into gate 40B and containers approaching the side roller 32a are urged off the transfer conveyor 24 onto the return conveyor 34 for a subsequent pass at gate 40B. Thus, the FIG. 5 arrangement, like that of FIG. 1, favors gate 40B but in a less direct fashion more suitable to containers of unusual shape. FIG. 6 shows still another possibility for the relative rotation of rollers 32 and 32a wherein both of said rollers turn in the same counterclockwise direction. Such an arrangement results in the favoring of gate 40A, an approach which could be of substantial benefit in a machine such as that shown in FIG. 1 wherein two lines of containers carried by the transfer conveyor 24 are to be merged into one such line prior to being deposited on the take away conveyor 22.

Turning now to the detailed description of the mechanism for rotating the rollers 32 and 32a, a power take-off pulley 70, best shown in FIGS. 1 and 2, is so supported in the machine as to be in frictional engagement with the upstream end 35 of the return conveyor 34. This pulley is thus driven by the conveyor drive system and is supported for rotation about a vertical spindle 72, best shown in FIGS. 3–6, which is rotatably supported from above the plane of the various conveyors by a structure similar to that used to support the container guide means of FIGS. 1 and 2. More particularly, the said spindle is rotatably supported at its upper end by a lever 74, which lever is itself pivotally supported in a horizontal beam 76. The beam spans both conveyors 24 and 34 as shown in FIGS. 3–6 and the right-hand end 78 thereof is supported in the fixed framework of the machine as indicated generally at 80.

A take-up lever 82 is pivotally supported adjacent to the right-hand end 78 of the beam 76 and a sprocket 84 is rotatably received in the longer arm 86 of said lever 82 as shown. The shorter arm 88 thereof carries a short vertical post 89 to which is attached one end of a tension spring 90.

Both rollers, 32 and 32a, are rotatably supported on a pair of identically cantilevered members 92, 92 which are themselves slidably received on said beam 76 and adapted to being clamped thereto at any convenient location to provide a convenient means for laterally adjusting the rollers 32, 32a, both collectively and individually as mentioned. These rollers carry a pair of sprockets 94, 94 at their upper end and outboard of these sprockets on the members 92, 92 are a pair of idler sprockets 96, 96 which are also rotatably supported thereon.

Thus, the rollers 32 and 32a can be driven in any of the directions indicated in FIGS. 3–6 by wrapping an endless chain 98 around the aforementioned sprockets 84, 94, 96 and a drive sprocket 100 which is rigidly connected to the spindle 72 and driven thereby whenever the conveyor 34 is operating.

More specifically, with reference to FIG. 3 wherein the center roller 32 is to be rotated in the clockwise direction and the side roller 32a is to be rotated in the counterclockwise direction, the chain 98 is oriented as shown and the spring 90 is connected between a short vertical post 91a on lever 74 and said post 89 on lever 82. The said spring and the location of said post 91a with respect to the pivotal axis of the lever assures that the frictional drive pulley 70 remains in engagement with the conveyor drive system as well as assuring that the chain itself remains properly tensioned. It should be noted that the arrangement of the chain and the various sprockets, especially the pivotally mounted sprocket 84, permits the cantilevered members 92, 92 to be adjusted longitudinally of the beam 76 as mentioned.

Referring now to FIG. 4, the same basic chain and sprocket arrangement is shown except that the directions of rotation of the rollers 32 and 32a have been reversed. The chain 98 is reversed from its FIG. 3 direction by providing an extension 102 on the conveyor pulley shaft. This shaft extension 102 rotates in the same direction as in the FIG. 3 arrangement but an auxiliary pulley 104 attached thereto engages the opposite side of frictional pulley 70 driving it and the spindle 72 to which it is attached in the opposite direction from that shown in FIG. 3. The latter pulley 70 is held in frictional engagement with said auxiliary pulley 104 by the spring 90 which must now be connected between the auxiliary post 91b on lever 74 and said post 89 on lever 82. As so arranged the chain remains properly tensioned and the aforementioned adjustments of members 92, 92 along beam 76 can be readily accomplished.

Turning now to FIG. 5, a chain and sprocket arrangement are there shown which permit both rollers to be rotated in the same clockwise direction. While a shorter chain 99 is required in this setup than that required in FIGS. 3 and 4, the same chain could be used by merely removing some links therefrom, or alternatively by providing a somewhat larger sprocket (not shown) on take-up lever 82 in place of the sprocket 84. FIG. 5 is otherwise similar to FIG. 3 and hence need not be described in greater detail here.

FIG. 6 illustrates the same basic chain and sprocket arrangement shown in FIG. 5 except that the directions of rotation of the rollers 32 and 32a have been reversed. As described with reference to FIG. 4, the chain 99 is reversed from its FIG. 5 direction by locating spring 90 between the auxiliary post 91b and post 89 so that the frictional drive pulley 70 engages the flange of the auxiliary pulley 104. As so arranged the pulley 70 remains engaged, the chain remains properly tensioned, and the aforementioned lateral adjustments of the rollers 32, 32a with respect to the secondary conveyor 24 can be readily accomplished.

The invention claimed is:

1. A machine for depositing a plurality of containers on a primary or take away conveyor and comprising a vibrating transfer plate for feeding flanked containers therealong, a transfer conveyor which is adapted to operate at a linear speed significantly less than that of said primary conveyor and is arranged in a common plane therewith, said transfer conveyor having a downstream end located in closely spaced relationship to said primary conveyor and an upstream edge portion which is operatively associated with a downstream end of said transfer plate so as to receive said flanked containers, dividing means above said transfer conveyor and adjacent said edge portion thereof for dividing said flanked containers into at least two columns or lines on said transfer conveyor, a circular transfer disc in the plane of said conveyors, said disc being rotatably supported so that spaced points on the circumference thereof are tangent to adjacent edges of said primary and transfer conveyors at first and second points respectively, guide means above said conveyors and said disc so that containers carried downstream by said transfer conveyors are urged laterally off said conveyor and onto said disc at said first point of tangency, said guide means also acting on the containers carried by said disc so as to urge the same radially outwardly off the disc onto said primary conveyor at said second point of tangency, and a pair of driven rollers rotatably supported above said transfer conveyor upstream of said guide means and downstream of said dividing means and defining at least one gate for aligning at least one of said lines of containers on said transfer conveyor.

2. A machine for depositing a plurality of containers on a primary conveyor as set forth in claim 1 and including container recirculating means adapted to receive containers failing to enter said gate and to refeed the same onto said transfer conveyor for a subsequent pass at said gate.

3. A machine for depositing a plurality of containers on a primary conveyor as set forth in claim 1 and including means for adjustably positioning said rollers laterally with respect to said transfer conveyor.

4. A machine for depositing a plurality of containers on a primary conveyor as set forth in claim 1 and including means for adjustably positioning each of said rollers laterally with respect to said transfer conveyor and to one another.

5. A machine for depositing a plurality of containers on a primary conveyor as set forth in claim 1 wherein said container guide means comprise at least one guide rail having an upstream portion which cooperates with one of said rollers so as to define a second gate in general lateral alignment with said one gate for aligning said other line of containers on said transfer conveyor.

6. A machine for depositing a plurality of containers on a primary conveyor as set forth in claim 5 and including means for adjustably positioning said rollers laterally both collectively and individually with respect to said guide rail.

7. A machine for depositing a pluraitly of containers on a primary conveyor as set forth in claim 6 and including means for altering the direction of rotation of said rollers.

8. A machine for depositing a plurality of containers on a primary conveyor as set forth in claim 6 and including means for collectively altering the directions of rotation of said rollers, and means for individually altering the direction of rotation of each roller with respect to the other in said pair.

9. A machine for depositing a plurality of containers on a primary conveyor as set forth in claim 5 wherein said container dividing means includes at least one vane laterally movable with respect to said dividing means so as to permit adjustment of the lateral spacing between said lines of containers.

10. A machine for depositing a plurality of containers on a primary or take away conveyor and comprising, vibrating transfer plate means for feeding flanked containers therealong, a transfer conveyor which is adapted to operate at a lineal speed significantly less than that of said primary conveyor and is arranged in a common plane therewith, said transfer conveyor having a downstream end located in closely spaced relationship to said primary conveyor, said transfer conveyor having an upstream end located in closely spaced relationship to said said vibrating transfer plate means and adapted to receive said flanked containers therefrom, container dividing means above said transfer conveyor and adjacent to said edge portion thereof whereby said flanked containers being received on said transfer conveyor are divided into at least two lines or columns thereon, a circular transfer disc in the plane of said conveyors and rotatably supported in the framework of the machine so that spaced points on the circumference thereof are tangent to adjacent edges of said primary and transfer conveyors at first and second points respectively, a first guide rail above said transfer conveyor and said disc to urge containers from both lines off the former and onto the latter adjacent to the said first point of tangency therebetween, a second guide rail above said disc and said primary conveyor to urge containers radialy outwardly off the former and onto the latter adjacent to said second point of tangency therebetween, said second guide rail being laterally spaced from an intermediate portion of said first guide rail so as to urge containers from both of said lines into a single line for deposit on said primary conveyor, a peripheral guide rail associated with said transfer disc, and an eccentric stationary post above said disc so that containers failing to enter the opening between said first and second guide rails are recirculated on said disc for a subsequent pass at said opening.

11. A machine for depositing a plurality of containers on a primary conveyor and comprising, vibrating transfer plate means for feeding flanked containers therealong, a transfer conveyor which is adopted to operate at a lineal speed significantly less than that of said primary conveyor and is arranged in a common plane therewith, said transfer conveyor having a downstream end located in closely spaced relationship to said primary conveyor, said transfer conveyor having an upstream edge portion which is operatively associated with said vibrating transfer plate means and adapted to receive said flanked containers therefrom, container dividing means above said transfer conveyor and adjacent to said edge portion thereof whereby said flanked containers being received thereon are divided into at least two lines or columns on said conveyor, a circular transfer disc in the plane of said conveyors and rotatably supported in the framework of the machine so that spaced points on the circumference thereof are tangent to adjacent edges of said primary and transfer conveyors at first and second points respectively, a first guide rail above said transfer conveyor and said disc to urge containers from one of said lines off the former and onto the latter adjacent to the said first point of tangency therebetween, a second guide rail in laterally spaced relation to the first so as to similarly urge said second line of containers at a point adjacent said first point, a downstream portion of said second guide rail adapted to urge containers in said first line radially outwardly off the disc onto the said primary conveyor adjacent to said second point of tangency therebetween, and a third guide rail laterally spaced from said second guide rail and located above said disc and said primary conveyor to urge said second line of containers radially outwardly off the former and onto the later adjacent to said second point of tangency therebetwen whereby two lines of containers are deposited on said primary conveyor.

12. A machine for depositing a plurality of containers on a primary conveyor as set forth in claim 11 and including a pair of driven rollers cooperatively associated with said first guide rail to define two gates the first of which is between one of said rollers and said first guide rail and the second of which is between said pair of rotating rollers.

13. A machine for depositing a plurality of containers on a primary conveyor as set forth in claim 12 and including a return conveyor adjacent to said transfer conveyor but opposite in direction therefrom, said return conveyor having an upstream end portion adapted to receive from said transfer conveyor those containers which fail to enter one of said gates, guide means above said transfer and return conveyors, and said return conveyor having a downstream end cooperatively associated with said guide whereby said containers are fed back onto the upstream end of said transfer conveyor to be refed towards said gate.

14. A machine for depositing a plurality of containers on a primary or take away conveyor and comprising, vibrating transfer plate means for feeding flanked containers therealong, a transfer conveyor which is adapted to operate at a lineal speed significantly less than that of said primary conveyor and is arranged in a common plane therewith, said transfer conveyor having a downstream end located in closely spaced relationship to said primary conveyor, said transfer conveyor having an upstream edge portion which is operatively associated with said vibrating transfer plate means and adapted to receive said flanked containers therefrom, container dividing means above said transfer conveyor and adjacent to said edge portion thereof whereby said flanked containers being received on said transfer conveyor are divided into at least two lines or columns thereon, a circular transfer disc in the plane of said conveyors and rotatably supported in the framework of the machine so that spaced points on the circumference thereof are tangent to adjacent edges of said primary and transfer conveyors at first and second points respectively, a first guide rail above said transfer conveyor and said disc to urge containers from both lines off the former and onto the latter adjacent to the said first point of tangency therebetween, a second guide rail above said disc and said primary conveyor to urge containers radially outwardly off the former and onto the latter adjacent to said second point of tangency therebetween, said second guide rail being laterally spaced from an intermediate portion of said first guide rail so as to urge containers from both of said lines into a single line for deposit on said primary conveyor, and a pair of driven rollers cooperatively associated with said first guide rail to define two gates the first of which is between one of said rollers and said first guide rail and the second of which is between said pair of rotating rollers.

15. A machine for depositing a plurality of containers on a primary conveyor as set forth in claim 14 and including a return conveyor adjacent to said transfer conveyor but opposite in direction therefrom, said return conveyor having an upstream end portion adapted to receive from said transfer conveyor those containers which fail to enter one of said gates, guide means above said transfer and return conveyors, and said return conveyor having a downstream end cooperatively associated with said guide means whereby said containers are fed back onto the upstream end of said transfer conveyor to be refed towards said gate.

References Cited by the Examiner
UNITED STATES PATENTS

| | | | |
|---|---|---|---|
| 742,488 | 10/1903 | Polk | 198—32 |
| 1,784,010 | 12/1930 | Johnson | 198—30 |
| 2,380,910 | 7/1945 | Newton. | |
| 2,763,359 | 9/1956 | Rose | 198—30 |

SAMUEL F. COLEMAN, *Primary Examiner.*

ERNEST A. FALLER, *Examiner.*

UNITED STATES PATENT OFFICE
CERTIFICATE OF CORRECTION

Patent No. 3,232,411                                                  February 1, 1966

Constantine W. Kulig

It is hereby certified that error appears in the above numbered patent requiring correction and that the said Letters Patent should read as corrected below.

Column 4, line 33, for "contaners" read -- containers --; column 7, line 41, for "pluraitly" read -- plurality --; line 66, strike out "end located in closely spaced relationship to said" and insert instead -- edge portion which is operatively associated with --; column 8, line 7, for "radialy" read -- radially --; same column 8, line 70, after "guide" insert -- means --.

Signed and sealed this 31st day of January 1967.

(SEAL)
Attest:

ERNEST W. SWIDER                                         EDWARD J. BRENNER
Attesting Officer                                               Commissioner of Patents